Figure 1:
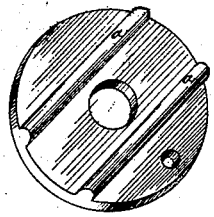
Figure 2:
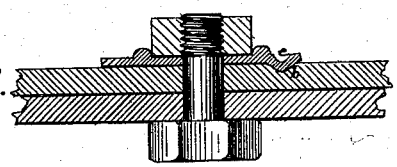
Figure 3:
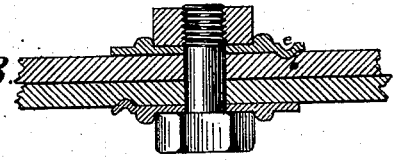
Figure 4:
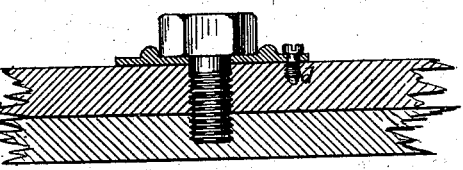
Figure 5:
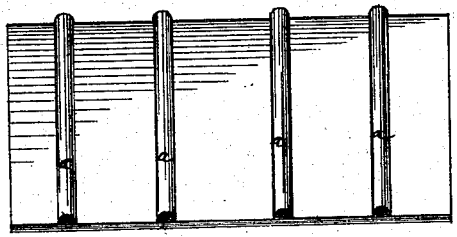

Thomas C. Hargrave.
Metal Washer.

No. 113427           Patented Apr. 4 1871

Witnesses:
Fred. Artos.
Henry N. Myggatt

Inventor:
Thos. C. Hargrave
by his Attys:
A.H. & R.K. Evans

United States Patent Office.

THOMAS C. HARGRAVE, OF BOSTON, MASSACHUSETTS.

Letters Patent No. 113,427, dated April 4, 1871.

IMPROVEMENT IN ROLLED METALLIC STRIPS FOR WASHERS.

The Schedule referred to in these Letters Patent and making part of the same.

*To whom it may concern:*

Be it known that I, THOMAS C. HARGRAVE, of Boston, in the county of Suffolk and State of Massachusetts, have invented a new and improved Rolled-Metal Bar or Plate from which to Cut Blanks for Metal Washers, said washers having ribs which prevent bolts, nuts, or screws from becoming loose by vibration of the parts, secured without the use of locks, straps, springs, or other devices, the said washer being cheap, durable, and effective.

The following is a clear, full, and exact description of my improved plate, reference being had to the accompanying drawing making a part of this specification, in which—

Figure I is a perspective view of a washer cut from my improved plate.

Figures II, III, and IV are sectional views showing the application of the same.

Figure V is a perspective view of my improved rolled-metal sheet from which the washers are cut.

The object of my invention is to furnish a plate from which can be cut washers, as shown in Figs. I, II, III, and IV.

To enable others to make and use my invention, I will proceed to describe the manner in which I have carried it out.

Fig. I represents a rolled and punched-metal washer, having one or more ribs, *a*, rolled upon its surface at such a distance from the center of the washer that they shall be directly against the side of the head or nut of the bolt or screw, for the purpose of holding the same in place when the washer is secured.

To use a washer so constructed upon metals an indentation may be made in the surface against which the washer bears, and under its outer edge, as shown at *b*, Fig. II. The washer being placed upon the bolt next the head or nut, or both, as desired; then, when the bolt or nut is screwed tight, the rib or ribs *a* on the washer form a connection with the head or nut, as shown in Fig. II, causing the washer to turn with the nut and also become tight.

To secure the washer, that portion of it over the indentation in the surface against which it bears is forced into the indentation by means of an ordinary set-punch, as shown at *c*, (see Figs. II and III,) securing the washer and nut in a perfect manner and without injury to either bolt or nut, and without the use of lock-straps, springs, or other devices.

When used upon wood the bolt or nut is secured by a nail or pin driven through the hole, as shown at *d*, Fig. IV, thus securing it effectually and without indentation.

My improved bar or plate is constructed by rolling the metal into strips or sheets having the rib or ribs *a* rolled thereon, as shown in Fig. V. The ordinary punch and die are slotted or grooved to receive the metal thus prepared, and the washers are punched out in the usual manner.

To remove a nut thus secured it is simply necessary to apply a wrench to the nut or head, and exert a sufficient pressure to remove the indentation.

It will be seen that washers thus constructed can be readily applied to every description of machinery or work where it is desirable to secure the nuts, bolts, or screws from becoming loose, while at the same time washers cut from my improved plate are cheap, strong, simple, and durable, more so than those made by other processes.

I do not claim a metal washer, as shown in Figs. I, II, III, and IV, as I am aware that such forms are old; but,

What I claim as my invention, and desire to secure by Letters Patent, is—

Strips of metal rolled into sheets, with ribs thereon, as specified, for the purpose of making washers, substantially as set forth.

THOMAS C. HARGRAVE.

Witnesses:
JOS. NICKERSON,
DANIEL PRATT.